(12) United States Patent
Won

(10) Patent No.: US 12,497,029 B2
(45) Date of Patent: Dec. 16, 2025

(54) VEHICLE AND CONTROL METHOD THEREOF

(71) Applicants: Hyundai Motor Company, Seoul (KR); Kia Corporation, Seoul (KR)

(72) Inventor: Sangbok Won, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 197 days.

(21) Appl. No.: 17/846,934

(22) Filed: Jun. 22, 2022

(65) Prior Publication Data

US 2022/0410879 A1 Dec. 29, 2022

(30) Foreign Application Priority Data

Jun. 25, 2021 (KR) .................. 10-2021-0083025

(51) Int. Cl.
*B60W 30/00* (2006.01)
*B60W 10/18* (2012.01)
(Continued)

(52) U.S. Cl.
CPC ............ *B60W 30/09* (2013.01); *B60W 10/18* (2013.01); *B60W 10/20* (2013.01);
(Continued)

(58) Field of Classification Search
CPC ...... B60W 30/09; B60W 10/18; B60W 10/20; B60W 30/0956; B60W 40/04; B60W 50/16; B60W 2050/143; B60W 2050/146; B60W 2420/403; B60W 2420/408; B60W 2554/4041; B60W 2554/4045;
(Continued)

(56) References Cited

U.S. PATENT DOCUMENTS

| 2007/0279199 A1* | 12/2007 | Danz ................ G08G 1/166 |
| | | 701/301 |
| 2011/0160950 A1* | 6/2011 | Naderhirn ............ G05D 1/0202 |
| | | 701/28 |

(Continued)

FOREIGN PATENT DOCUMENTS

DE 102014009254 A1 * 12/2015 ............. B60Q 1/143

*Primary Examiner* — Wilson W Tsui
*Assistant Examiner* — David Faber
(74) *Attorney, Agent, or Firm* — Morgan Lewis & Bockius LLP

(57) ABSTRACT

A system and method enhance vehicle safety by identifying dangerous objects using a precise map database. A sensor acquires an object's current motion information, and a navigator obtains vehicle location information. A controller processes this data, converting the object's motion into first absolute coordinates on a precise map. These first absolute coordinates are compared with an expected motion value, which is represented as second absolute coordinates on the precise map and derived from statistical historical driving data of other vehicles stored in the precise map database. If a difference value between these two sets of absolute coordinates exceeds a predetermined threshold, the object is
(Continued)

identified as dangerous. Information about the identified dangerous object, along with the ego-vehicle, is then visually presented to the driver on the precise map via a human-machine interface (HMI), thereby improving situational awareness.

17 Claims, 10 Drawing Sheets

(51) Int. Cl.
| | |
|---|---|
| *B60W 10/20* | (2006.01) |
| *B60W 30/09* | (2012.01) |
| *B60W 30/095* | (2012.01) |
| *B60W 40/04* | (2006.01) |
| *B60W 50/16* | (2020.01) |
| *B60W 50/14* | (2020.01) |

(52) U.S. Cl.
CPC ........ *B60W 30/0956* (2013.01); *B60W 40/04* (2013.01); *B60W 50/16* (2013.01); *B60W 2050/143* (2013.01); *B60W 2050/146* (2013.01); *B60W 2420/403* (2013.01); *B60W 2420/408* (2024.01); *B60W 2554/4041* (2020.02); *B60W 2554/4045* (2020.02); *B60W 2554/4046* (2020.02); *B60W 2554/406* (2020.02); *B60W 2554/80* (2020.02); *B60W 2556/10* (2020.02)

(58) Field of Classification Search
CPC ... B60W 2554/4046; B60W 2554/406; B60W 2554/80; B60W 2556/10
See application file for complete search history.

(56) References Cited

U.S. PATENT DOCUMENTS

| | | | |
|---|---|---|---|
| 2017/0328719 A1* | 11/2017 | Yamamuro | G01C 21/26 |
| 2018/0267076 A1* | 9/2018 | Shou | B60Q 9/00 |
| 2019/0031193 A1* | 1/2019 | Kojima | G01C 21/3848 |
| 2020/0252859 A1* | 8/2020 | McKeefery | H04W 4/48 |
| 2020/0290604 A1* | 9/2020 | Kim | G05D 1/0088 |
| 2020/0298844 A1* | 9/2020 | Ikuta | G01S 13/931 |
| 2021/0009121 A1* | 1/2021 | Oboril | B60W 30/0953 |
| 2021/0245769 A1* | 8/2021 | Yamaoka | B60W 30/0956 |
| 2021/0261159 A1* | 8/2021 | Pazhayampallil | B60W 10/18 |
| 2021/0272018 A1* | 9/2021 | Casas | G06N 7/01 |
| 2021/0370921 A1* | 12/2021 | Silva | B60W 60/0027 |
| 2021/0387645 A1* | 12/2021 | Kim | B60W 30/18154 |
| 2022/0185053 A1* | 6/2022 | Neilson | B60G 17/0165 |
| 2022/0197280 A1* | 6/2022 | Venkatadri | G07C 5/0808 |
| 2022/0227396 A1* | 7/2022 | Tsuchida | B60W 60/0027 |
| 2022/0333950 A1* | 10/2022 | Akbarzadeh | G01C 21/3804 |

* cited by examiner

LOCATION INFORMATION OF
THE OBJECT IN THE LONGITUDINAL DIRECTION

LOCATION INFORMATION OF
THE OBJECT IN THE LATERAL DIRECTION

VEHICLE AND CONTROL METHOD THEREOF

CROSS-REFERENCE TO RELATED APPLICATION(S)

The present application claims priority to Korean Patent Application No. 10-2021-0083025, filed on Jun. 25, 2021, the entire contents of which is incorporated herein for all purposes by this reference.

BACKGROUND OF THE PRESENT DISCLOSURE

Field of the Present Disclosure

The present disclosure relates to a vehicle and a control method thereof, and more to a driver assistance system.

Description of Related Art

A driver assistance system (ADAS) determines the possibility of a collision with a pedestrian or other vehicle by utilizing various sensors such as a camera and radar mounted on a vehicle, and automatically controls a braking device or a steering device based on the determination to avoid a collision accident in advance.

The driver assistance system is required to proactively determine the possibility of a collision with other vehicle, and the possibility of a collision is determined based on a current location and current speed of the other vehicle.

However, because the types or situations of actual roads are different, uniform judgment as described above may not prepare for sudden situations or may make an occupant an uneasiness due to sudden braking.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a vehicle configured for preventing a collision in advance by preemptively identifying a dangerous object and dispelling an uneasiness of an occupant due to autonomous driving, and a control method thereof.

Additional aspects of the present disclosure will be set forth in part in the description which follows, and in part, will be obvious from the description, or may be learned by practice of the present disclosure.

In accordance with an aspect of the present disclosure, a vehicle includes a sensor provided to obtain first motion information which is motion state information of an object, a navigator provided to obtain location information of the vehicle, and a controller including at least one processor configured to process the location information and the first motion information, wherein the controller is configured to receive an expected motion value of the object based on the location information, compare the expected motion value with the first motion information to determine a difference value therebetween, and conclude the object as a dangerous object when the difference value is greater than or equal to a predetermined value.

The controller is configured to receive the expected motion value from a memory or a server in which the expected motion value is stored.

The expected motion value may be data in which positions and speeds of a plurality of other vehicles passing through a corresponding area in which the vehicle is driving are accumulated.

The controller may convert a relative distance included in the first motion information into first absolute coordinates with respect to the vehicle, and the expected motion value may be obtained by converting the positions of the plurality of other vehicles with respect to the vehicle into second absolute coordinates.

The controller may be configured to determine a position difference value by comparing the first absolute coordinates with the second absolute coordinates, and determine that the object is the dangerous object when the position difference value is greater than or equal to the predetermined value.

The controller may be configured to determine a speed difference value by comparing a speed for each location of the first absolute coordinates with a speed for each location of the second absolute coordinates, and determine that the dangerous object causes a traffic jam when the speed difference value is greater than or equal to the predetermined value.

The controller may be configured to determine that the dangerous object is a sudden stop vehicle when a difference between a first speed change amount for each location of the first absolute coordinates and a second speed change amount for each location of the second absolute coordinates, with respect to a first direction, which is a driving direction of the vehicle, is greater than or equal to the predetermined value.

The controller may be configured to determine that the dangerous object is a reckless driving vehicle when a difference between a first speed change amount for each location of the first absolute coordinates and a second speed change amount for each location of the second absolute coordinates, with respect to a second direction perpendicular to the first direction, is equal to or greater than the predetermined value.

The vehicle may further include a human machine interface (HMI) device provided to provide information on the dangerous object, wherein the controller may be configured to control the HMI device to output the information on the dangerous object when the dangerous object is detected.

The controller may be configured to determine the dangerous object as an avoidance target, and generate a control signal for performing steering control or braking control based on the dangerous object.

In accordance with an aspect of the present disclosure, a method of controlling a vehicle includes obtaining first motion information, which is motion state information of an object, and location information of the vehicle, receiving an expected motion value of the object based on the location information, comparing the expected motion value with the first motion information to determine a difference value, and determining the object as a dangerous object when the difference value is greater than or equal to a predetermined value.

The receiving of the expected motion value of the object may include receiving the expected motion value from a memory provided in the vehicle or a server provided outside the vehicle.

The expected motion value may be data in which positions and speeds of a plurality of other vehicles passing through a corresponding area in which the vehicle is driving are accumulated.

The comparing of the expected motion value with the first motion information to determine the difference value may include converting a relative distance included in the first motion information into first absolute coordinates with respect to the vehicle, and the expected motion value is obtained by converting the positions of the plurality of other vehicles with respect to the vehicle into second absolute coordinates.

The determining of the object as the dangerous object may include determining a position difference value by comparing the first absolute coordinates with the second absolute coordinates, and determining that the object is the dangerous object when the position difference value is greater than or equal to the predetermined value.

The determining of the object as the dangerous object may include determining a speed difference value by comparing a speed for each location of the first absolute coordinates with a speed for each location of the second absolute coordinates, and determining that the dangerous object causes a traffic jam when the speed difference value is greater than or equal to the predetermined value.

The determining of the object as the dangerous object may include determining that the dangerous object is a sudden stop vehicle when a difference between a first speed change amount for each location of the first absolute coordinates and a second speed change amount for each location of the second absolute coordinates, with respect to a first direction, which is a driving direction of the vehicle, is greater than or equal to the predetermined value.

The determining of the object as the dangerous object may include determining that the dangerous object is a reckless driving vehicle when a difference between a first speed change amount for each location of the first absolute coordinates and a second speed change amount for each location of the second absolute coordinates, with respect to a second direction perpendicular to the first direction, is equal to or greater than the predetermined value.

The control method may further include determining the dangerous object as an avoidance target, and generating a control signal for performing steering control or braking control based on the dangerous object.

In accordance with an aspect of the present disclosure, a computer program provided to be stored in a recording medium, wherein the computer program executes: by being coupled to a computer device, obtaining first motion information, which is motion state information of an object, and location information of the vehicle, receiving an expected motion value of the object based on the location information, comparing the expected motion value with the first motion information to determine a difference value, and determining the object as a dangerous object when the difference value is greater than or equal to a predetermined value.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
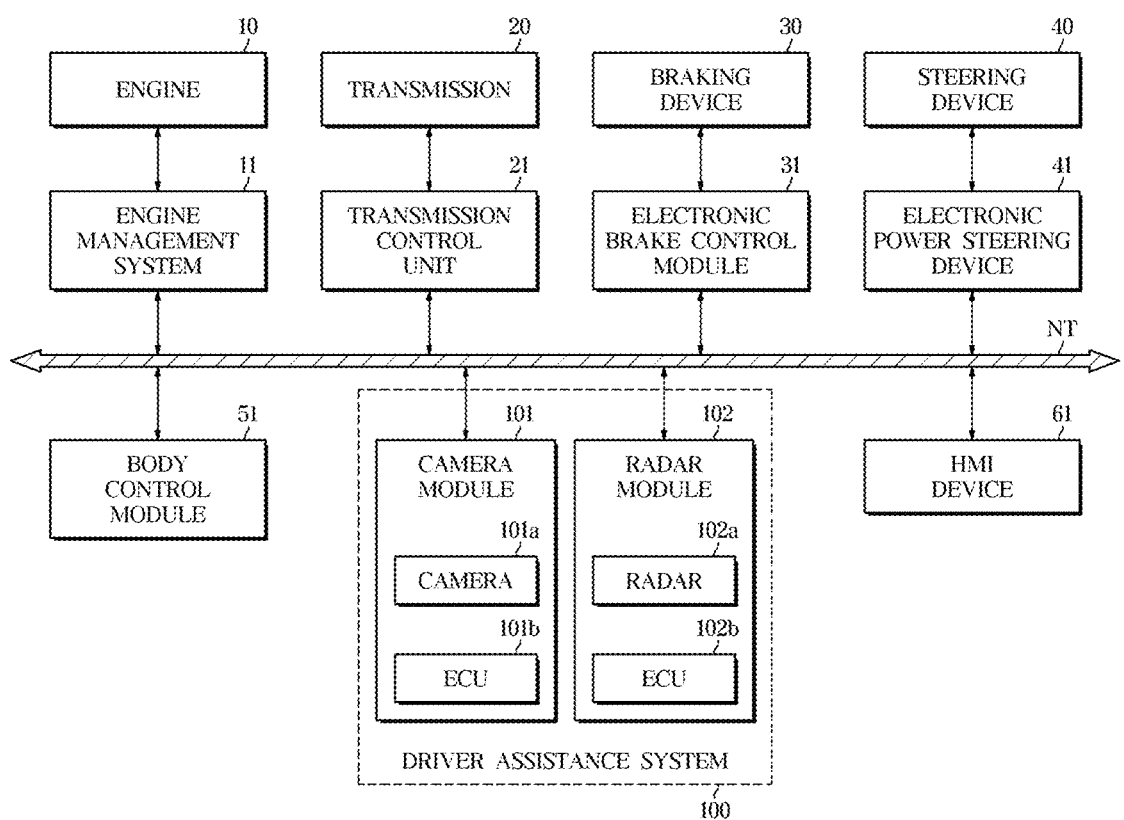
FIG. 1 illustrates a configuration of a vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Throughout the specification, like reference numerals refer to like elements. The present specification does not describe all the elements of the embodiments, and duplicative contents between general contents or embodiments in the field of the present disclosure will be omitted. The terms 'part,' 'module,' 'member,' and 'block' used in the exemplary embodiment may be embodied as software or hardware, and it is also possible for a plurality of 'units,' 'modules,' 'members,' and 'blocks' to be embodied as one component, or one 'unit,' 'module,' 'member,' and 'block' to include a plurality of components according to various exemplary embodiments of the present disclosure.

Throughout the specification, when a part is referred to as being "connected" to another part, it includes not only a direct connection but also an indirect connection, and the indirect connection includes connecting through a wireless network.

Furthermore, when it is described that a part "includes" an element, it means that the element may further include other elements, not excluding the other elements unless specifically stated otherwise.

Throughout the specification, when a member is referred to as being "on" another member, this includes not only a case in which a member is in contact with another member but also a case in which another member is present between the two members.

The terms 'first,' 'second,' etc. are used to distinguish one element from another element, and the elements are not limited by the above-mentioned terms.

The singular forms "a," "an," and "the" include plural referents unless the context clearly dictates otherwise.

In each step, an identification numeral is used for convenience of explanation, the identification numeral does not describe the order of the steps, and each step may be performed differently from the order specified unless the context clearly states an order.

Hereinafter, the present disclosure will be described in detail with reference to the accompanying drawings.

Figure 2:
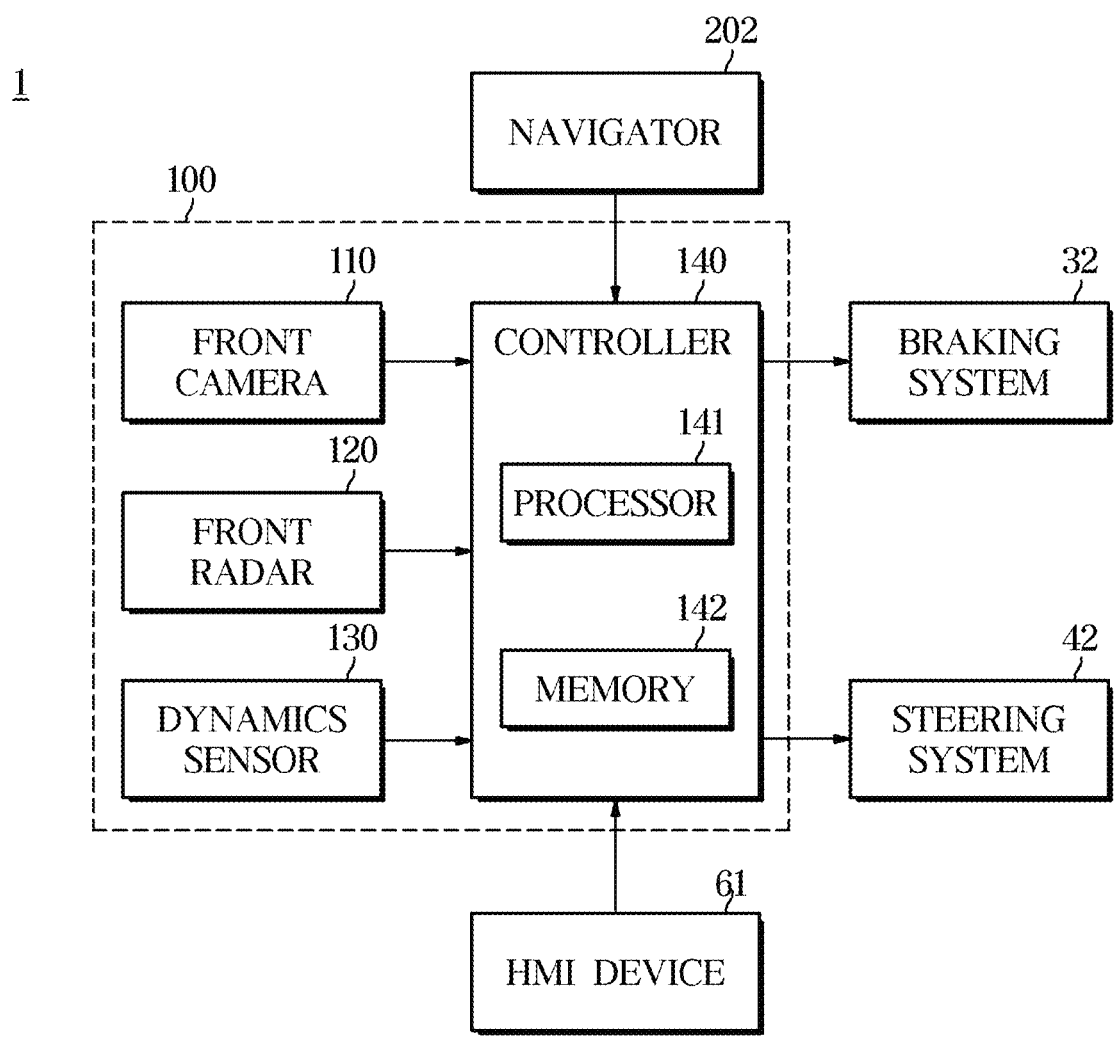
FIG. 2 is a control block diagram of the vehicle according to an exemplary embodiment of the present disclosure.
Figure 3:
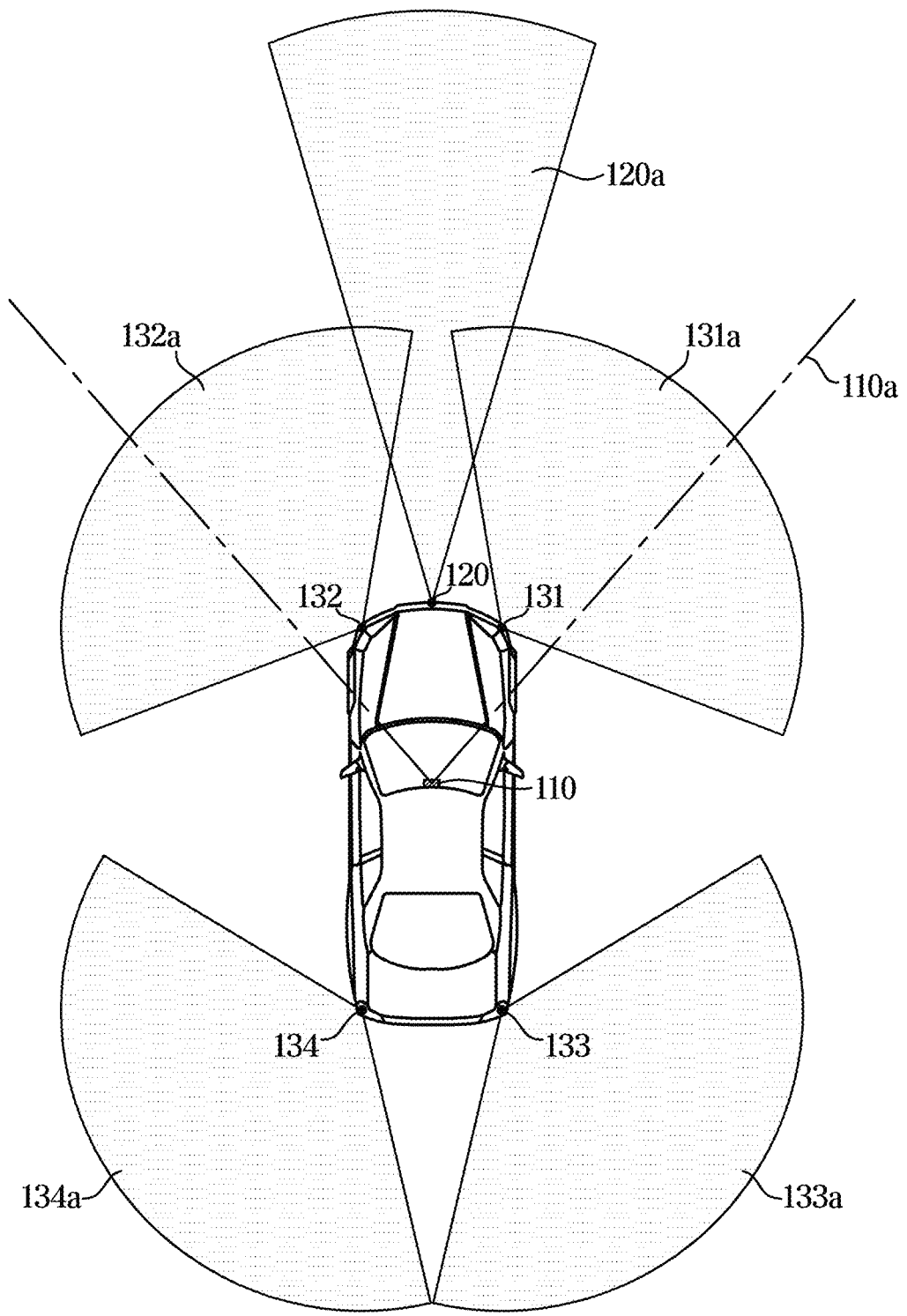
FIG. 3 illustrates a camera and a radar included in a driver assistance system according to an exemplary embodiment of the present disclosure.

FIG. 1 illustrates a configuration of a vehicle according to an exemplary embodiment of the present disclosure, FIG. 2 is a control block diagram of the vehicle according to an exemplary embodiment of the present disclosure, and FIG. 3 illustrates a camera and a radar included in a driver assistance system according to an exemplary embodiment of the present disclosure.

As illustrated in FIG. 1, a vehicle 1 includes an engine 10, a transmission 20, a braking device 30, and a steering device 40. The engine 10 includes a cylinder and a piston and may generate power for driving the vehicle 1. The transmission 20 includes a plurality of gears and may transmit the power generated by the engine 10 to wheels. The braking device 30 may decelerate or stop the vehicle 1 through friction with the wheels. The steering device 40 may change a driving direction of the vehicle 1.

The vehicle 1 may include a plurality of electronic components. For example, the vehicle 1 further includes an engine management system (EMS) 11, a transmission control unit (TCU) 21, an electronic brake control module 31, an electronic power steering (EPS) device 41, a body control module (BCM), and a driver assistance system (DAS).

The engine management system 11 may control the engine 10 in response to an acceleration intention of a driver through an accelerator pedal or a request from a driver assistance system 100. For example, the engine management system 11 may control a torque of the engine 10.

The transmission control unit 21 may control the transmission 20 in response to a shift command of the driver through a shift lever and/or a driving speed of the vehicle 1. For example, the transmission control unit 21 may adjust a shift ratio from the engine 10 to the wheels.

The electronic brake control module 31 may control the braking device 30 in response to a braking intention of the driver through the brake pedal and/or slip of the wheels. For example, the electronic brake control module 31 may temporarily release the braking of the wheel in response to the slip of the wheel detected when the vehicle 1 is braked (Anti-lock braking system; ABS). The electronic brake control module 31 may selectively release the braking of the wheel in response to oversteering and/or understeering detected when the vehicle 1 is steered (Electronic stability control, ESC). Also, the electronic brake control module 31 may temporarily brake the wheel in response to the slip of the wheel detected when the vehicle 1 is driven (Traction control system, TCS).

The electronic power steering device 41 may assist an operation of the steering device 40 so that the driver may easily manipulate a steering wheel in response to a steering intention of the driver through the steering wheel. For example, the electronic power steering device 41 may assist the operation of the steering device 40 to decrease a steering force during a low-speed driving or parking and increase the steering force during a high-speed driving.

A body control module 51 may control operations of the electronic components to provide convenience to the driver or ensure safety of the driver. For example, the body control module 51 may control head lamps, wipers, a cluster, multi-function switches, direction indicator lamps, and the like.

A human machine interface (HMI) device 61 corresponds to a device that visually, aurally or tactilely informs the driver of state information and operation information of the vehicle 1. For example, the HMI device 61 includes a display device, a speaker, a HUD (Head up display), a light-emitting diode (LED) light, a haptic device, and the like, which are provided inside the vehicle 1, and may output various notifications in response to a control signal from a controller 140.

The driver assistance system 100 may assist the driver to operate (drive, brake, and steer) the vehicle 1. For example, the driver assistance system 100 may detect an environment around the vehicle 1 (e.g., another vehicle, a pedestrian, a cyclist, a lane, a road sign, etc.), and may control the driving and/or braking and/or steering of the vehicle 1 in response to the detected environment.

The driver assistance system 100 may provide various functions to the driver. For example, the driver assistance system 100 may provide forward collision-avoidance assist (FCA), lane departure warning (LDW), lane keeping assist (LKA), high beam assist (HBA), autonomous emergency braking (AEB), traffic sign recognition (TSR), smart cruise control (SCC), blind spot detection (BSD), and the like.

The driver assistance system 100 includes a camera module 101 provided to obtain image data around the vehicle 1 and a radar module 102 provided to obtain radar data around the vehicle 1. The camera module 101 includes a camera 101a and an electronic control unit (ECU) 101b, and may photograph the front of the vehicle 1 and recognize other vehicles, pedestrians, cyclists, lanes, road signs, and the like. The radar module 102 includes a radar 102a and an electronic control unit 102b, and may obtain a relative position, a relative speed, etc. of an object (e.g., another vehicle, a pedestrian, a cyclist, etc.) around the vehicle 1.

The driver assistance system 100 is not limited to that illustrated in FIG. 1, and may further include a Light Detection and Ranging (LiDAR) for scanning the surroundings of the vehicle 1 and detecting an object.

The electronic components as described above may communicate with each other through a vehicle communication network NT. For example, the electronic components may transmit and receive data through Ethernet, Media Oriented Systems Transport (MOST), Flexray, Controller Area Network (CAN), Local Interconnect Network (LIN), etc. For example, the driver assistance system 100 may transmit a driving control signal, a braking signal, and a steering signal to the engine management system 11, the electronic brake control module 31, and the electronic power steering device 41, respectively, through the vehicle communication network NT.

As illustrated in FIG. 2, the vehicle 1 may include a braking system 32, a steering system 42, and the driver assistance system 100.

As described above, the vehicle 1 may perform avoidance control based on a position and relative speed of the object under the driver assistance system 100 performing the forward collision-avoidance assist (FCA). The object refers to other vehicles, pedestrians, cyclists, and the like, and refers to all objects that the vehicle 1 which is driving should avoid.

The braking system 32 may include the electronic brake control module 31 (see FIG. 1) and the braking device 30 (see FIG. 1) described with reference to FIG. 1, and the steering system 42 may include the electronic power steering device 41 (see FIG. 1) and the steering device 40 (see FIG. 1).

The driver assistance system 100 may include a front camera 110, a front radar 120, and a plurality of corner radars. The front camera 110, the front radar 120, and the plurality of corner radars, which are sensors for detecting an object outside the vehicle 1, may be collectively referred to as a sensor.

The sensor may detect an object, obtain data on the object, and provide the obtained object to the controller 140. In the instant case, the object data may include image data obtained from the front camera 110 and radar data obtained from the front radar 120 and/or the corner radars.

The front camera 110 may have a field of view 110a facing the front of the vehicle 1 as illustrated in FIG. 3. The front camera 110 may be provided, for example, on a front windshield of the vehicle 1.

The front camera 110 may photograph the front of the vehicle 1 and obtain image data of the front of the vehicle 1. The image data of the front of the vehicle 1 may include a location on another vehicle or a pedestrian or a cyclist or a lane located in the front of the vehicle 1.

The front camera 110 may include a plurality of lenses and an image sensor. The image sensor may include a plurality of photodiodes for converting light into an electrical signal, and the plurality of photodiodes may be provided in a two-dimensional matrix.

The front camera 110 may be electrically connected to the controller 140. For example, the front camera 110 may be connected to the controller 140 through the vehicle communication network NT, may be connected to the controller 140 through a hard wire, or may be connected to the controller 140 through a printed circuit board (PCB).

The front camera 110 may transmit image data of the front of the vehicle 1 to the controller 140.

The front radar 120 may have a field of sensing 120a facing the front of the vehicle 1 as illustrated in FIG. 3. The front radar 120 may be provided, for example, on a grille or a bumper of the vehicle 1.

The front radar 120 may include a transmitting antenna (or transmitting antenna array) radiating a transmitted radio wave toward the front of the vehicle 1, and a receiving antenna (or receiving antenna array) for receiving a reflected wave reflected by an object. The front radar 120 may obtain front radar data from the transmitted radio wave transmitted by the transmitting antenna and the reflected wave received by the receiving antenna. The front radar data may include distance information and speed information on another vehicle or a pedestrian or a cyclist located in the front of the vehicle 1. The front radar 120 may determine a state distance to the object based on a phase difference (or time difference) between the transmitted wave and the reflected wave, and may determine a relative speed of the object based on a frequency difference between the transmitted wave and the reflected wave.

The front radar 120 may be connected to the controller 140 through, for example, the vehicle communication network (NT) or the hard wire or the printed circuit board. The front radar 120 may transmit the front radar data to the controller 140.

A dynamics sensor 130 detects a motion of the vehicle 1 and obtains motion data based on the motion of the vehicle 1. The motion data includes information on the driving speed, a steering angle, and a yaw rate of the vehicle 1. The dynamics sensor 130 is a variety of known sensors such as a wheel speed sensor, a steering angle sensor, and a yaw rate sensor, and may be disposed at an appropriate location such as a wheel and a steering wheel of the vehicle 1 to detect the driving speed, steering angle, yaw rate, etc. of the vehicle 1 and transmit the detected one to the controller 140.

The plurality of corner radars includes a first corner radar 131 provided on a front right side of the vehicle 1, a second corner radar 132 provided on a front left side of the vehicle 1, a third corner radar 133 provided on a rear right side of the vehicle 1, and a fourth corner radar 134 provided on a rear left side of the vehicle 1.

The first corner radar 131 may have a field of sensing 131a facing the front right side of the vehicle 1 as illustrated in FIG. 3. The front radar 120 may be provided, for example, on a right side of a front bumper of the vehicle 1. The second corner radar 132 may have a field of sensing 132a facing the front left side of the vehicle 1, and may be provided, for example, on a left side of the front bumper of the vehicle 1. The third corner radar 133 may have a field of sensing 133a facing the rear right side of the vehicle 1, and may be provided, for example, on a right side of a rear bumper of the vehicle 1. The fourth corner radar 134 may have a field of sensing 134a facing the rear left side of the vehicle 1, and may be provided, for example, on a left side of the rear bumper of the vehicle 1.

Each of the first, second, third, and fourth corner radars 131, 132, 133, and 134 may include a transmitting antenna and a receiving antenna. The first, second, third, and fourth corner radars 131, 132, 133 and 134 may obtain first corner radar data, second corner radar data, third corner radar data, and fourth corner radar data, respectively. The first corner radar data may include distance information and speed information on another vehicle or a pedestrian or cyclist (hereinafter referred to as "object") located on the front right side of the vehicle 1. The second corner radar data may include distance information and speed information of an object positioned on the front left side of the vehicle 1. The third and fourth corner radar data may include distance information and relative speed of an object located on the rear right side of the vehicle 1 and the rear left side of the vehicle 1.

Each of the first, second, third, and fourth corner radars 131, 132, 133, 134 may be connected to the controller 140 through, for example, the vehicle communication network NT or the hard wire or the printed circuit board. The first, second, third, and fourth corner radars 131, 132, 133, and 134 may transmit first, second, third, and fourth corner radar data to the controller 140, respectively.

The controller 140 may include the electronic control unit 101b (see FIG. 1) of the camera module 101 (see FIG. 1) and/or the electronic control unit 102b (see FIG. 1) of the radar module 102 (see FIG. 1) and/or a separate integrated electronic control unit.

The controller 140 includes a processor 141 and a memory 142.

The processor 141 may process front image data of the front camera 110, the front radar data of the front radar 120, and the corner radar data of the plurality of corner radars, and may generate a braking signal and a steering signal for controlling the braking system 32 and the steering system 42. For example, the processor 141 may include an image processor for processing the front image data of the front camera 110 and/or a digital signal processor for processing the radar data of the front radar 120 and/or a micro control unit (MCU) for generating a braking signal and a steering signal.

The processor 141 may detect objects in the front of the vehicle 1 (e.g., other vehicles, pedestrians, cyclists, etc.) based on the front image data of the front camera 110 and the front radar data of the front radar 120.

The processor 141 may obtain positions (distances and directions) and relative speeds of the objects in the front of the vehicle 1 based on the front radar data of the front radar 120. The processor 141 may obtain positions (directions) and type information (e.g., whether the object is another vehicle, a pedestrian, or a cyclist, etc.) of the objects in the front of the vehicle 1 based on the front image data of the front camera 110. Also, the processor 141 may match the objects detected by the front image data to the objects detected by the front radar data, and may obtain the type information, positions, and relative speeds of the objects in the front of the vehicle 1 based on the matching result.

The processor 141 may generate a braking signal and a steering signal based on the type information, positions, and relative speeds of the front objects.

For example, the processor 141 may determine a time to collision (TTC) between the vehicle 1 and the front object based on the positions (distances) and relative speeds of the front objects, and may warn the driver of a collision based on a comparison between the time to collision (TTC) and a predetermined reference time, or transmit the braking signal to the braking system 32, or transmit the steering signal to the steering system 42.

As an exemplary embodiment of the present disclosure, the processor 141 may determine a distance to collision (DTC) based on the relative speeds of the front objects, and may warn the driver of a collision based on a comparison between the distance to collision and distances to front objects, or transmit the braking signal to the braking system 32, or transmit the steering signal to the steering system 42.

The processor 141 may obtain positions (distances and directions) and relative speeds of the objects on the sides (front right, front left, rear right, rear left) of the vehicle 1 based on the corner radar data of the plurality of corner radars.

The processor 141 may transmit the steering signal to the steering system 42 based on the positions (distances and directions) and relative speeds of the lateral objects of the vehicle 1.

For example, when it is determined that vehicle 1 is expected to collide with a front object based on the time to the collision or the distance to the collision, the processor 141 may transmit the steering signal to the steering system 42 to avoid a collision with the front object.

The processor 141 determines whether the vehicle 1 avoids a collision with the front object by changing the driving direction of the vehicle 1 based on the positions (distances and directions) and relative speeds of the lateral objects of the vehicle 1. For example, when there is no object on the sides of the vehicle 1, the processor 141 may transmit the steering signal to the steering system 42 to avoid a collision with the front object. When the vehicle 1 is not predicted to collide with the lateral objects after steering of the vehicle 1 based on the positions (distances and directions) and relative speeds of the lateral objects, the processor 141 may transmit the steering signal to the steering system 42 to avoid a collision with the front object. When the vehicle 1 is predicted to collide with the lateral objects after steering of the vehicle 1 based on the positions (distances and directions) and relative speeds of the lateral objects, the processor 141 may not transmit the steering signal to the steering system 42.

The processor 141 receives location information from a navigator 202 and obtains an expected motion value from the server or the memory 142 based on the location information.

The navigator 202 may transmit and receive information through bidirectional communication with at least one device for controlling a traffic flow and providing a dynamic route. For example, the navigator 202 may obtain location information of the vehicle 1 through a Global Positioning System (GPS) satellite and transmit departure/destination information and vehicle speed information input by the driver (or passengers) together with the obtained location information to the server, and the server may provide traffic network information, optimal route information to a destination, and the like to the navigator 202. In the instant case, the navigator 202 may be a device pre-provided in the vehicle 1 or a device capable of transmitting and receiving data through wired/wireless communication with the vehicle 1.

The processor 141 may obtain an expected motion value corresponding to an area in which the vehicle 1 is driving from the server or the memory 142 based on the location information obtained from the navigator 202. In the instant case, the expected motion value may correspond to a statistical value determined by accumulating motion data of other vehicles in a corresponding area in which the vehicle 1 is driving. The expected motion value may be data in which positions and speeds of a plurality of other vehicles passing through the corresponding area in which the vehicle 1 is driving are accumulated. For example, the expected motion value corresponds to data obtained by implementing the corresponding area as a precise map and averaging paths of other vehicles in the past as absolute coordinates on the precise map. In the instant case, the expected motion value may be implemented as a lateral position and a longitudinal position on the precise map. Of course, the expected motion value may represent information on a direction in which other vehicles in the past typically drive through changes in the lateral position and longitudinal position.

Also, the expected motion value may be implemented as a lateral speed and a longitudinal speed through a differentiation of the lateral position and longitudinal position on the precise map. Also, the expected motion value may be implemented as a lateral acceleration and a longitudinal acceleration through a differentiation of the lateral speed and the longitudinal speed on the precise map.

The above-described expected motion value is generated by the server continuously collecting data from other vehicles. The vehicle 1 may obtain the expected motion value from the server in real time or may use the expected motion value previously stored in the memory 142.

The present disclosure is for determining a dangerous vehicle among other vehicles driving around the vehicle 1 based on the above-described expected motion value. A specific embodiment using the expected motion value will be described later with reference to FIGS. 4 to 10.

The memory 142 may store a program and/or data for the processor 141 to process image data, a program and/or data for processing radar data, and a program and/or data for the processor 141 to generate a braking signal and/or a steering signal.

The memory 142 may temporarily store the image data received from the front camera 110 and/or the radar data received from the radars 120, and may temporarily store the processing result of the image data and/or the radar data of the processor 141.

The memory 142 may include a flash memory and a non-volatile memory such as a read only memory (ROM) and an erasable programmable read only memory (EPROM) as well as a volatile memory such as a S-RAM and a D-RAM.

The driver assistance system 100 is not limited to that illustrated in FIG. 2, and may further include the LiDAR for scanning the surroundings of the vehicle 1 and detecting an object.

Accordingly, the controller 140 may transmit the braking signal to the braking system 32 based on whether the vehicle 1 is predicted to collide with the front object. When there is no object on the sides or the vehicle 1 is not predicted to collide with a side object, the controller 140 may transmit the steering signal to the steering system 42 to avoid a collision with the front object. When the vehicle 1 is predicted to collide with a side object after steering, the controller 140 may not transmit the steering signal to the steering system 42.

In the above, the components for implementing the present disclosure and the operation of each of the components have been described. Hereinafter, processes of determining a dangerous object based on the above-described components and performing notification control, braking control, and steering control based on the dangerous object will be described.

Figure 4:
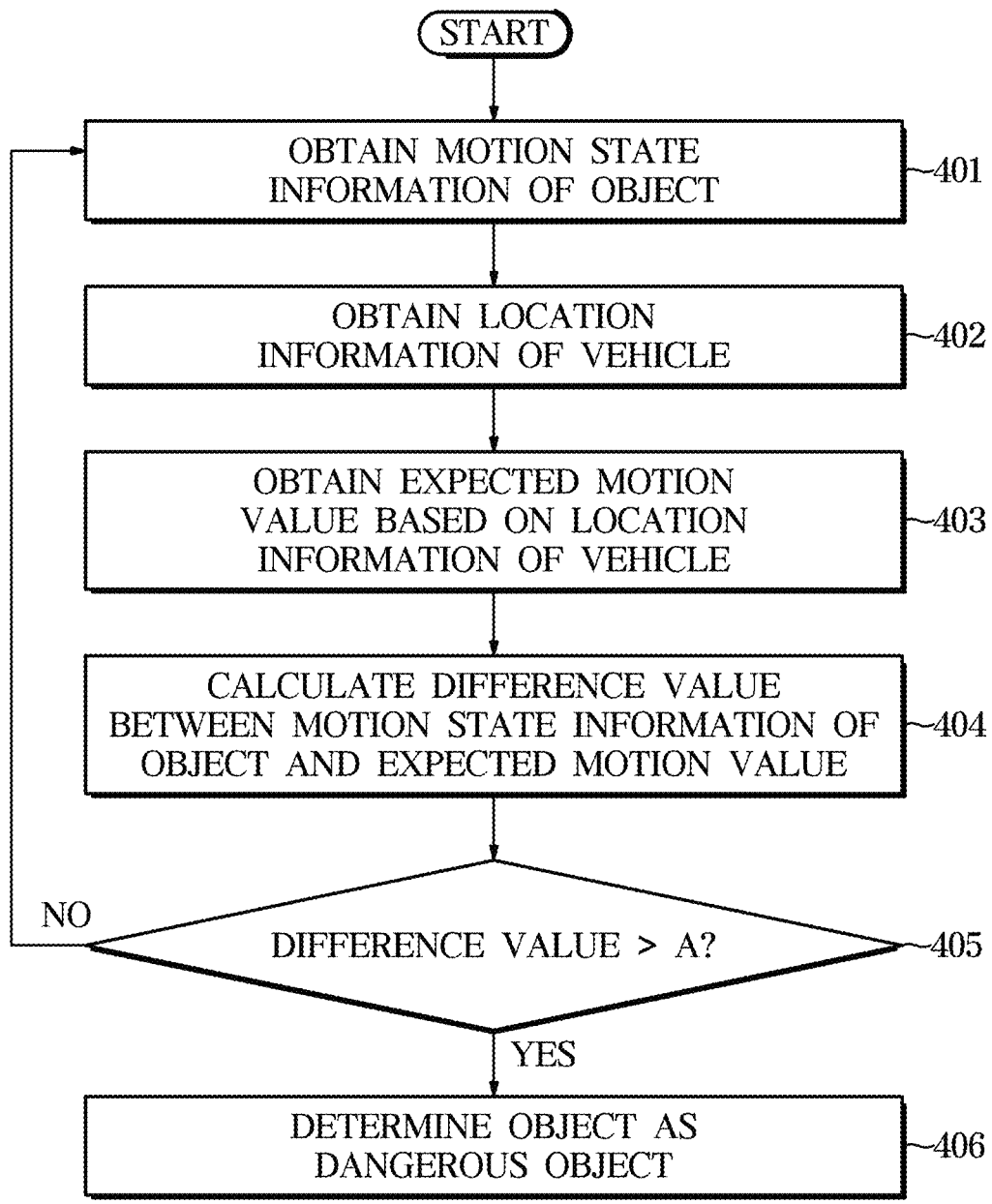
FIG. 4 is a flowchart of a control method of the vehicle according to the present disclosure.

FIG. 4 is a flowchart of a control method of the vehicle according to the present disclosure. Hereinafter, a control method of the vehicle according to the present disclosure will be described with reference to FIG. 4 together with FIG. 5.

The vehicle 1 obtains motion state information of an object (401). The motion state information of the object, which is data for comparison with the above-described expected motion value, is obtained to determine whether the object has a possibility of colliding with the vehicle 1 in the corresponding area in which the vehicle 1 is driving, or to determine whether the object may affect the driving of the vehicle 1. The object refers to another vehicle which may collide other than the vehicle 1 on a road.

The vehicle 1 obtains location information (402). The location information may be obtained from the navigator 202 provided in the vehicle 1. The location information is for identifying the characteristics or type of the road on which the vehicle 1 is located and providing an expected motion value corresponding thereto. The expected motion value may correspond to a statistical value determined by accumulating motion data of other vehicles in the corresponding area in which the vehicle 1 is driving.

The vehicle 1 obtains an expected motion value based on the location information (403). The vehicle 1 may provide a precise map corresponding to the corresponding area when receiving the location information, and may obtain the expected motion values of other vehicles based on the precise map.

The vehicle 1 determines a difference value between the motion state information of the object and the expected motion value (404). Processes related thereto will be described in more detail with reference to FIG. 5.

The present disclosure is for comparing a behavior of another vehicle driving around the vehicle 1 with a typical behavior of vehicles in the past, determining as a dangerous object when the other vehicle does not exhibit the typical behavior, and performing the notification control, braking control, and steering control by identifying the dangerous object as an object of interest.

Figure 5:
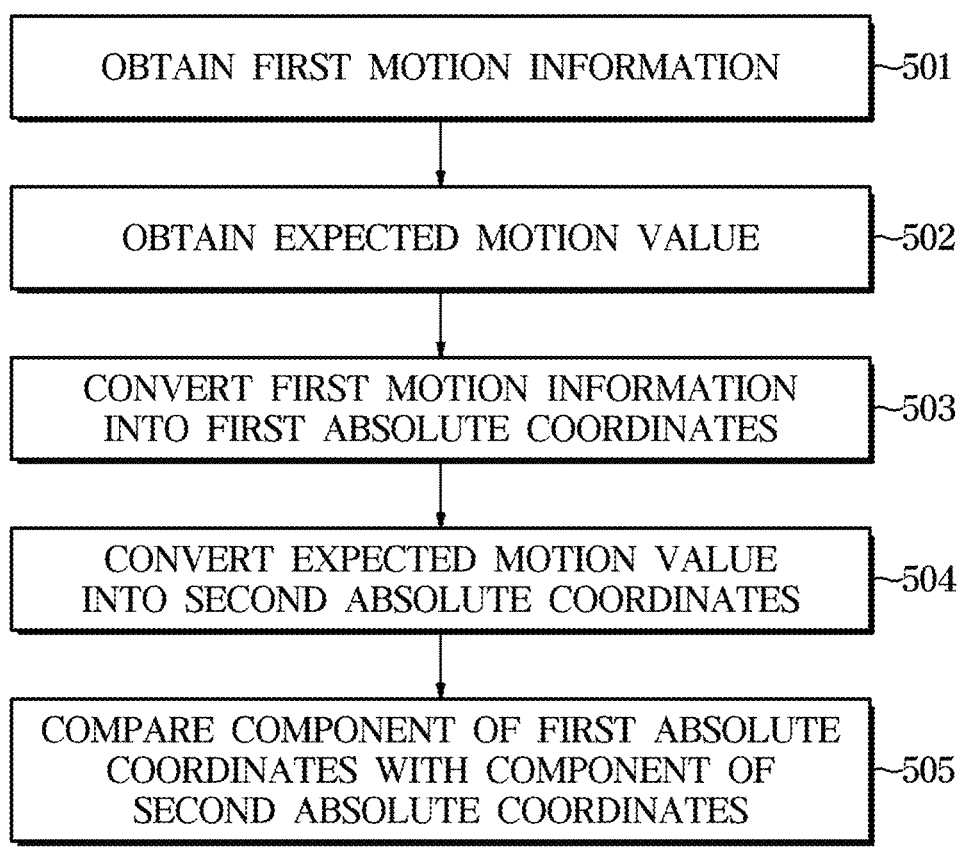
FIG. 5 is a flowchart referenced in the flowchart of FIG. 4.

To the present end, the vehicle 1 may perform a series of processes illustrated in FIG. 5 to determine a difference in behavior between the currently driving object and another vehicle in the past.

The vehicle 1 obtains first motion information (501) and obtains an expected motion value (502). In the instant case, the first motion information, which is related to the motion state information of the object which is driving, may include a relative position, relative speed, relative acceleration vehicle size, vehicle type, and driving direction of the object with respect to the vehicle 1.

The vehicle 1 converts the first motion information into first absolute coordinates (503) and converts the expected motion value into second absolute coordinates (504). The absolute coordinates, which are for quantitatively comparing respective values, correspond to data in which the lateral and longitudinal positions are reflected on the precise map. The expected motion value may be implemented as the lateral speed and the longitudinal speed in an absolute coordinate method through the differentiation of the lateral and longitudinal positions on the precise map.

Figure 6:
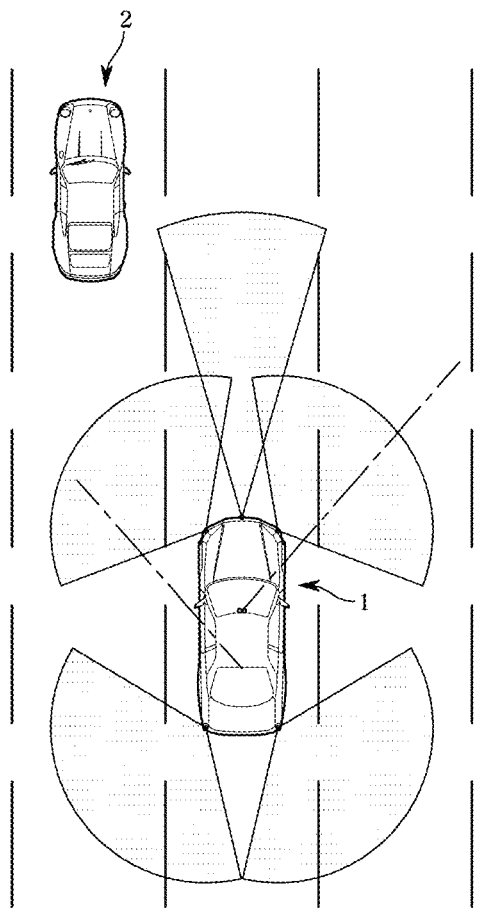
FIG. 6 illustrates an example of first motion information of an object.
Figure 6:
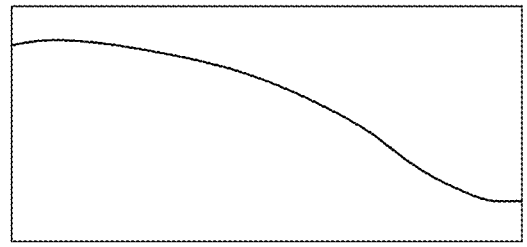
Figure 6:
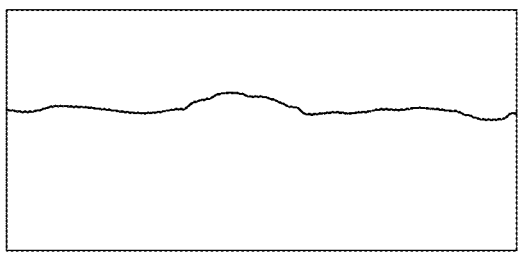

Referring to an example of the first motion information with reference to FIG. 6, the first motion information obtains a relative position of an object 2 with respect to the vehicle 1 to obtain longitudinal position information and lateral position information on the precise map. FIG. 6 is a graph illustrating the longitudinal position information and the lateral position information of the object 2 over time compared with the expected motion value. In a road section in which the vehicle 1 and the object 2 drive side by side, there will be no significant difference in lateral components, and longitudinal components will show some difference depending on acceleration or deceleration of the object 2. When a large variation occurs in the lateral component of the object 2, it may be predicted that the object 2 intends to change a lane or is in an unstable driving situation.

By comparing a component of the first absolute coordinates with a component of the second absolute coordinates (505), the vehicle 1 may determine whether a behavior of the object in the corresponding area deviates from a behavior of another normal vehicle in the past.

Referring again to FIG. 4, a determined difference value is compared with a predetermined value (405), and when the difference value is greater than or equal to the predetermined value, the object is determined as a dangerous object (406).

The difference value may be one of a direction difference value, a position difference value, a speed difference value, and an acceleration difference value on the precise map. An object of the difference value may be selected depending on the corresponding area through which the vehicle 1 passes. An exemplary embodiment according to the corresponding area will be described in detail with reference to FIG. 7, FIG. 8, FIG. 9 and FIG. 10.

Figure 7:
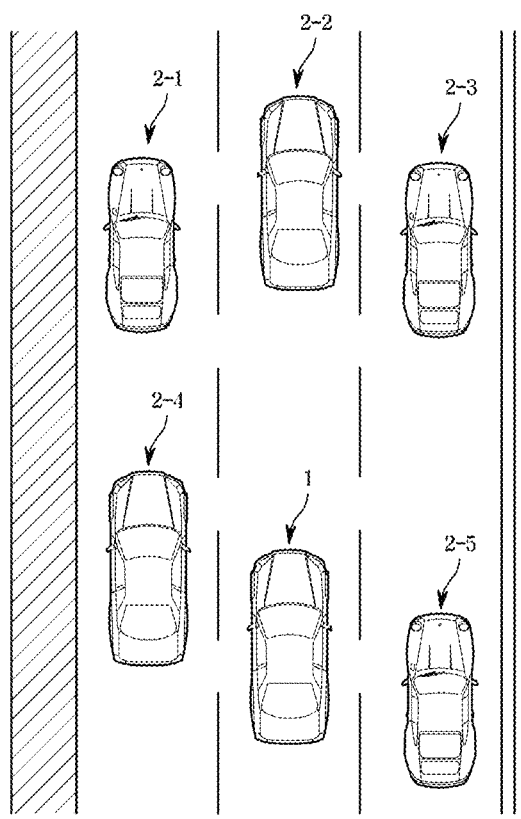
FIG. 7 illustrates an example of an expected motion in a road congestion situation.
Figure 7:
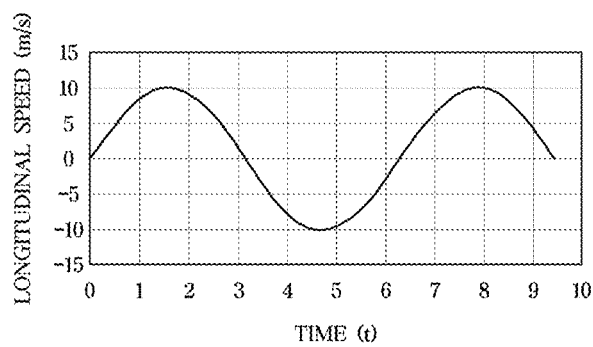
Figure 8:
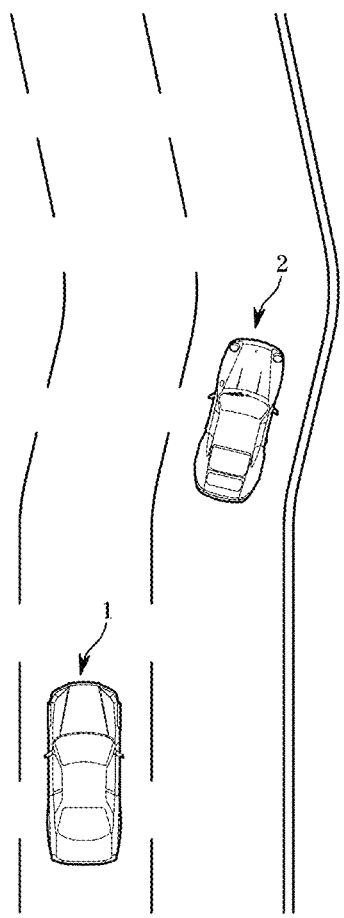
FIG. 8 illustrates an example of an expected motion value in a curved road.
Figure 8:
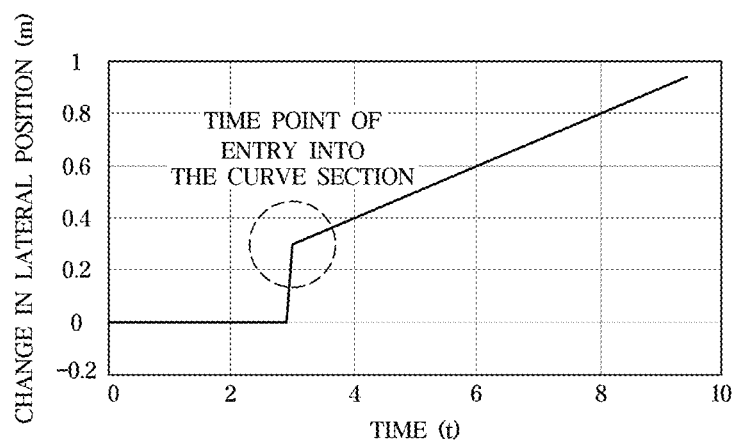
Figure 9:
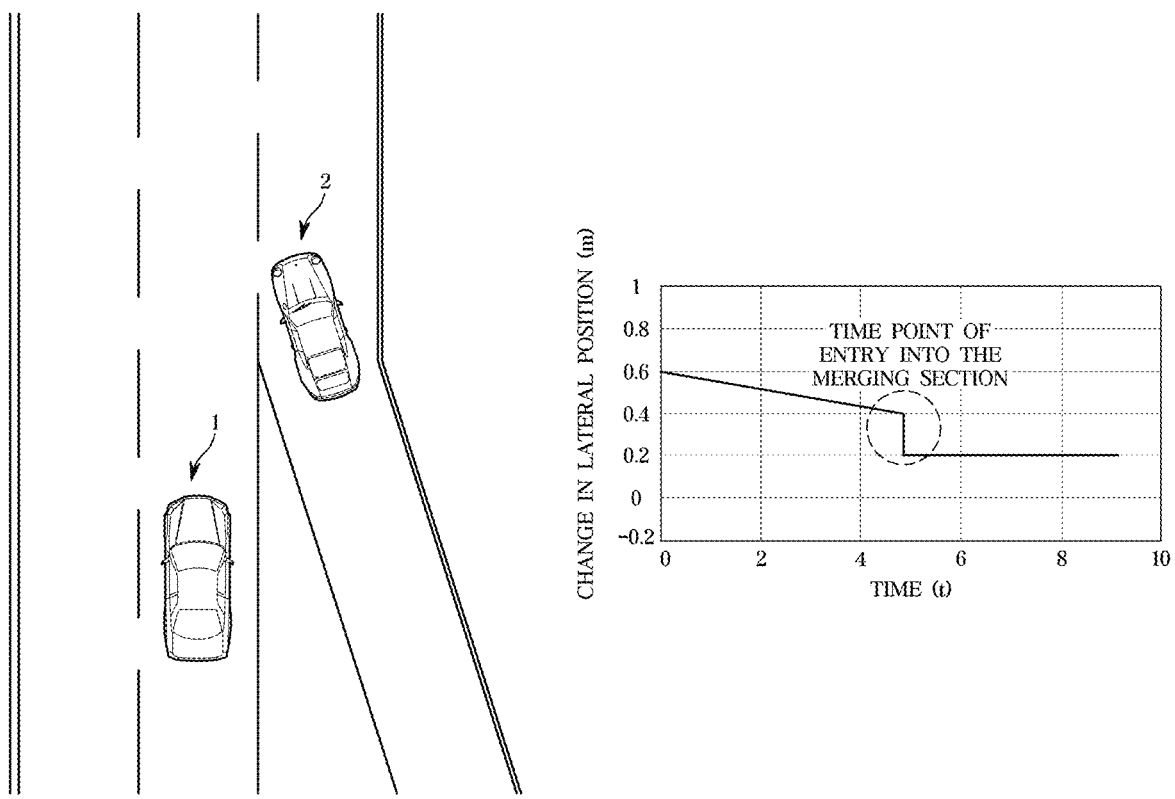
FIG. 9 illustrates an example of the expected motion value in a merging section road.
Figure 10:
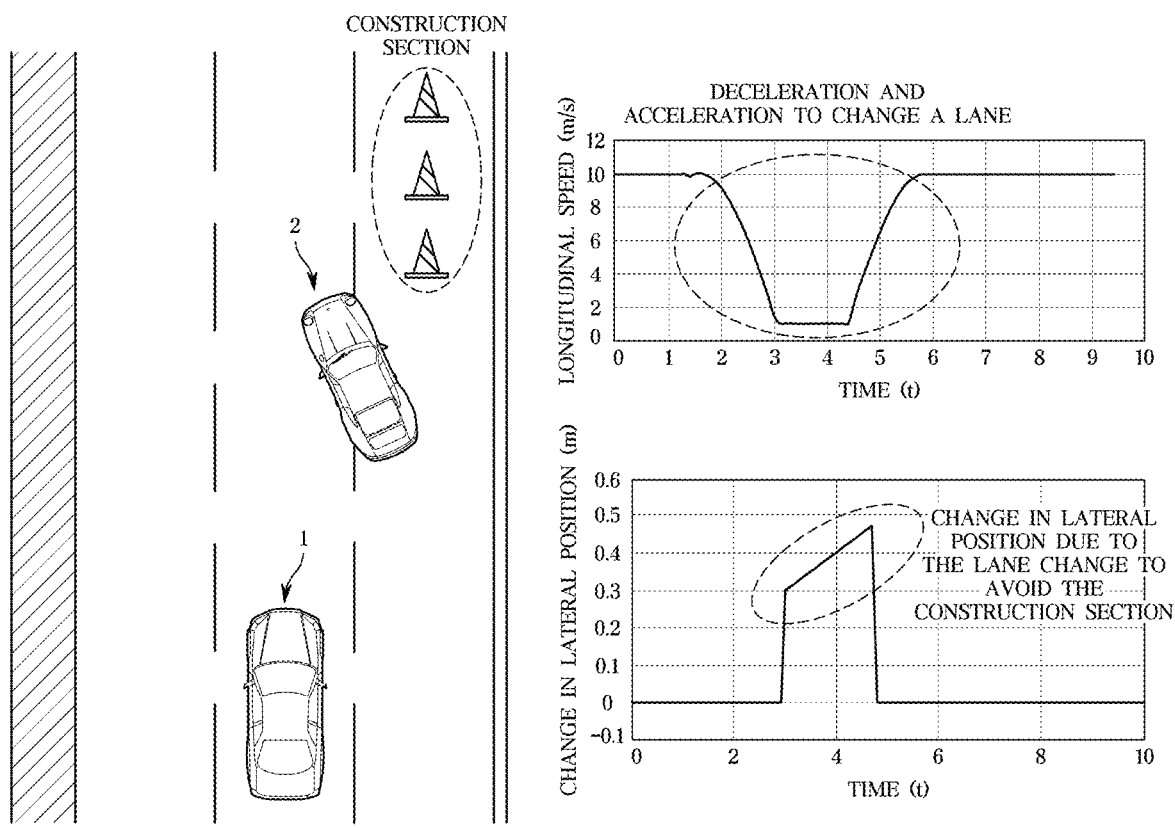
FIG. 10 illustrates an example of the expected motion value in a construction section road.

FIG. 7 illustrates an example of an expected motion in a road congestion situation, FIG. 8 illustrates an example of an expected motion value in a curved road, FIG. 9 illustrates an example of the expected motion value in a merging section road, and FIG. 10 illustrates an example of the expected motion value in a construction section road.

Referring to FIG. 7, in the corresponding area which is a section in which a road is in a congested situation, a longitudinal speed component in the expected motion values of a plurality of objects 2-1 to 2-5 appears to increase or decrease within a certain range. In the instant case, when at least one of the plurality of objects 2-1 to 2-5 has a longitudinal speed value outside a range of the expected motion value, the vehicle 1 may determine an object outside the range of the expected motion value as a dangerous object. Accordingly, in an exemplary embodiment of the present disclosure, when it is determined that the corresponding area is a congested section through the location information, a comparison target of the first absolute coordinates and the second absolute coordinates may be determined as the longitudinal speed value. In the instant case, the vehicle 1 may determine an object in which a longitudinal speed difference value is equal to or greater than the predetermined value as a dangerous object, and may determine that the dangerous object will cause a traffic jam.

Furthermore, when a difference between a first speed change amount for each location of the first absolute coordinates in a longitudinal direction and a second speed change amount for each location of the second absolute coordinates in the longitudinal direction is equal to or greater than the predetermined value, the vehicle 1 may determine that the dangerous object is a sudden stop vehicle.

Furthermore, when a difference between the first speed change amount for each location of the first absolute coordinates in a lateral direction and the second speed change amount for each location of the second absolute coordinates in the lateral direction is equal to or greater than the predetermined value, the vehicle 1 may determine that the dangerous object is a reckless driving vehicle.

The vehicle 1 may display information on the dangerous object through the HMI device or perform the steering control to avoid the dangerous object in an autonomous driving mode.

The vehicle 1 may perform the braking control or the steering control by setting the priority of a collision avoidance target as the highest priority among objects outside the range of the expected motion value. Furthermore, the vehicle 1 may express the vehicle 1 and the plurality of objects 2-1 to 2-5 as a precise map on the HMI device to visually display vehicles outside the range of the expected motion value. Furthermore, the vehicle 1 may display each object on the HMI device in a different color depending on an extent to which it is outside the range of the expected motion value.

As a result, the vehicle 1 may determine an object that excessively accelerates or decelerates by setting a target of the difference value as the longitudinal speed in a section in which the corresponding area is in a congested state in which it is difficult to change a lane, as a dangerous object.

Next, referring to FIG. 8, the corresponding area, which is a curved section on a road, is a section in which a lateral position of the object 2 with respect to the vehicle 1 may rapidly change when the object 2 travels along the curved section. In the instant case, when the lateral position of the object 2 does not change rapidly in the curved section, the object 2 is expected to interfere with a course of the vehicle 1 or to collide with the vehicle 1. Therefore, in an exemplary embodiment of the present disclosure when it is determined that the corresponding area is a curved road through the location information, the comparison target of the first absolute coordinates and the second absolute coordinates may be determined as the lateral position. For example, the vehicle 1 may determine the object 2 as a dangerous object when the lateral position of the object 2 has a large difference from a numerical value illustrated in FIG. 8.

In the instant case, the vehicle 1 may express the vehicle 1 and the object 2 as a precise map on the HMI device to notify the driver of the range of the expected motion value or that the object 2 is a dangerous object. Furthermore, the vehicle 1 may generate a warning sound or vibration through the speaker or the haptic device to notify the driver that the dangerous object is nearby.

As a similar example, referring to FIG. 9, in the corresponding area which is a merging section, it may be expected that the lateral position of the object 2 rapidly changes based on a time point of entry into the merging section. As in the exemplary embodiment of FIG. 8, even in the merging section, the comparison target of the first absolute coordinates and the second absolute coordinates may be determined as the lateral position, and the vehicle 1 may determine the object 2 as a dangerous object when the lateral position of the object 2 has a large difference from a numerical value in FIG. 9. The exemplary embodiment of FIG. 8 may be applied to a control process after determining that the object 2 is a dangerous object.

Referring to FIG. 10, in the corresponding area which is a construction section, it may be expected that the object 2 changes a lane along with deceleration when the object 2 enters the construction section. In an exemplary embodiment of the present disclosure, when it is determined that the corresponding area is a construction section through the location information, the comparison target of the first absolute coordinates and the second absolute coordinates may be determined as the lateral position and the longitudinal speed. Therefore, the vehicle 1 may determine the object 2 as a dangerous object when both the lateral position and the longitudinal speed of the object 2 have a large difference from numerical values of the graph illustrated in FIG. 10.

In the instant case, the vehicle 1 may express the vehicle 1 and the object 2 as a precise map on the HMI device to notify the driver of the range of the expected motion value or that the object 2 is a dangerous object. Furthermore, the vehicle 1 may generate a warning sound or vibration through the speaker or the haptic device to notify the driver that the dangerous object is nearby.

Herein, the disclosed exemplary embodiments of the present disclosure may be implemented in a form of a recording medium storing instructions executable by a computer. The instructions may be stored in a form of program code, and when executed by a processor, a program module may be generated to perform the operations of the disclosed exemplary embodiments of the present disclosure. The recording medium may be implemented as a computer-readable recording medium.

The computer-readable recording medium includes various kinds of recording media in which instructions which may be decrypted by a computer are stored. For example, there may be a read only memory (ROM), a random access memory (RAM), a magnetic tape, a magnetic disk, a flash memory, an optical data storage device, and the like.

As is apparent from the above, a vehicle and a control method thereof according to an aspect of the present disclosure can prevent an unexpected collision and dispel an uneasiness of an occupant during autonomous driving by identifying a dangerous vehicle in advance.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A vehicle comprising:
a sensor including a camera and a radar, and configured to obtain first motion information of an object, the first motion information including at least a relative distance and relative speed of the object with respect to the vehicle;
a navigator including a GPS receiver configured to acquire satellite signals and thereby obtain current location information of the vehicle through a Global Positioning System (GPS) satellite;
a memory storing a precise map database, the precise map database including statistical motion data of a plurality of other vehicles correlated with map locations of a precise map;
a controller electrically connected to the sensor, the navigator and the memory, the controller including at least one processor configured to:
process the current location information of the vehicle and the first motion information of the object;
convert the first motion information of the object into first absolute coordinates on the precise map based on the current location information of the vehicle;
receive, from the precise map database, an expected motion value of the object corresponding to the current location information of the vehicle, wherein the expected motion value is represented as second absolute coordinates on the precise map and corresponds to a statistical value derived from accumulated historical motion data, including positions and speeds, of the plurality of other vehicles that previously passed through a corresponding area represented on the precise map;
compare the first absolute coordinates representing a motion of the object with the second absolute coordinates representing the expected motion value to determine a difference value therebetween;
identify the object as a dangerous object when the difference value is greater than or equal to a predetermined value;
control a human machine interface (HMI) device of the vehicle to display information indicating the identified dangerous object, wherein the HMI device is configured to visually represent the vehicle and the identified dangerous object on the precise map; and
control the vehicle to steer away from the identified dangerous object.

2. The vehicle of claim 1, wherein the controller is configured to receive the expected motion value from the memory or a server in which the expected motion value is stored.

3. The vehicle of claim 1, wherein the controller configured to convert the first motion information of the object into first absolute coordinates on the precise map is configured to convert a relative distance, included in the first motion information, into the first absolute coordinates.

4. The vehicle of claim 3,
wherein the difference value includes a position difference value between the first absolute coordinates and the second absolute coordinates representing the expected motion value, and
wherein the controller is configured to determine the position difference value by comparing the first absolute coordinates with the second absolute coordinates, and to identify that the object is the dangerous object when the position difference value is greater than or equal to the predetermined value.

5. The vehicle of claim 3,
wherein the difference value includes a speed difference value, and
wherein the controller is configured to determine the speed difference value by comparing a speed for each location of the first absolute coordinates with a speed for each location of the second absolute coordinates, and to identify that the dangerous object causes a traffic jam when the speed difference value is greater than or equal to the predetermined value.

6. The vehicle of claim 3, wherein the controller is configured to identify that the dangerous object is a sudden stop vehicle when a difference between a first speed change amount for each location of the first absolute coordinates and a second speed change amount for each location of the second absolute coordinates, with respect to a first direction, which is a driving direction of the vehicle, is greater than or equal to the predetermined value.

7. The vehicle of claim 6, wherein the controller is configured to identify that the dangerous object is a reckless driving vehicle when a difference between a first speed change amount for each location of the first absolute coordinates and a second speed change amount for each location of the second absolute coordinates, with respect to a second direction perpendicular to the first direction, is equal to or greater than the predetermined value.

8. The vehicle of claim 1, wherein the controller is configured to identify the dangerous object as an avoidance target, and to generate a control signal for performing steering control or braking control based on the dangerous object.

9. A method of controlling a vehicle, the method comprising:
obtaining, by a sensor including a camera and a radar, first motion information of an object, the first motion information including at least a relative distance and relative speed of the object with respect to the vehicle;
obtaining, by a navigator including a GPS receiver, current location information of the vehicle by acquiring satellite signals;
accessing, from a memory storing a precise map database, the precise map database including statistical motion data of a plurality of other vehicles correlated with map locations of a precise map;
processing, by a controller including at least one processor, the current location information of the vehicle and the first motion information of the object;
converting, by the controller, the first motion information of the object into first absolute coordinates on the precise map based on the current location information of the vehicle;
receiving, by the controller, from the precise map database, an expected motion value of the object corresponding to the current location information of the vehicle, wherein the expected motion value is represented as second absolute coordinates on the precise map and corresponds to a statistical value derived from accumulated historical motion data, including positions and speeds, of the plurality of other vehicles that previously passed through a corresponding area represented on the precise map;

comparing, by the controller, the first absolute coordinates representing a motion of the object with the second absolute coordinates representing the expected motion value to determine a difference value therebetween;

identifying, by the controller, the object as a dangerous object when the difference value is greater than or equal to a predetermined value;

controlling, by the controller, a human machine interface (HMI) device of the vehicle to display information indicating the identified dangerous object, wherein the HMI device is configured to visually represent the vehicle and the identified dangerous object on the precise map; and controlling the vehicle to steer away from the identified dangerous object.

10. The method of claim 9, wherein the receiving of the expected motion value of the object includes receiving the expected motion value from the memory provided in the vehicle or a server provided outside the vehicle.

11. The method of claim 9, wherein the step of converting the first motion information of the object into first absolute coordinates on the precise map includes converting a relative distance, included in the first motion information, into the first absolute coordinates.

12. The method of claim 11,
wherein the difference value includes a position difference value, and
wherein the determining of the object as the dangerous object includes determining the position difference value by comparing the first absolute coordinates with the second absolute coordinates, and identifying that the object is the dangerous object when the position difference value is greater than or equal to the predetermined value.

13. The method of claim 11,
wherein the difference value includes a speed difference value, and
wherein the determining of the object as the dangerous object includes determining the speed difference value by comparing a speed for each location of the first absolute coordinates with a speed for each location of the second absolute coordinates, and identifying that the dangerous object causes a traffic jam when the speed difference value is greater than or equal to the predetermined value.

14. The method of claim 11, wherein the determining of the object as the dangerous object includes identifying that the dangerous object is a sudden stop vehicle when a difference between a first speed change amount for each location of the first absolute coordinates and a second speed change amount for each location of the second absolute coordinates, with respect to a first direction, which is a driving direction of the vehicle, is greater than or equal to the predetermined value.

15. The method of claim 14, wherein the determining of the object as the dangerous object includes identifying that the dangerous object is a reckless driving vehicle when a difference between a first speed change amount for each location of the first absolute coordinates and a second speed change amount for each location of the second absolute coordinates, with respect to a second direction perpendicular to the first direction, is equal to or greater than the predetermined value.

16. The method of claim 9, further including:
identifying, by the controller, the dangerous object as an avoidance target, and generating, by the controller, a control signal for performing steering control or braking control based on the dangerous object.

17. A Non-transitory computer-readable storage medium storing a computer program that, when executed by at least one processor of a controller in a vehicle, causes the controller to perform a method comprising:

obtaining, from a sensor including a camera and a radar, first motion information of an object, the first motion information including at least a relative distance and relative speed of the object with respect to the vehicle;

obtaining, from a navigator including a GPS receiver, current location information of the vehicle by acquiring satellite signals;

accessing, from a memory storing a precise map database, the precise map database including statistical motion data of a plurality of other vehicles correlated with map locations of a precise map;

processing the current location information of the vehicle and the first motion information of the object;

converting the first motion information of the object into first absolute coordinates on the precise map based on the current location information of the vehicle;

receiving, from the precise map database, an expected motion value of the object corresponding to the current location information of the vehicle, wherein the expected motion value is represented as second absolute coordinates on the precise map and corresponds to a statistical value derived from accumulated historical motion data, including positions and speeds, of the plurality of other vehicles that previously passed through a corresponding area represented on the precise map;

comparing the first absolute coordinates representing a motion of the object with the second absolute coordinates representing the expected motion value to determine a difference value therebetween;

identifying the object as a dangerous object when the difference value is greater than or equal to a predetermined value;

controlling a human machine interface (HMI) device of the vehicle to display information indicating the identified dangerous object; and controlling the vehicle to steer away from the identified dangerous object, wherein the HMI device is configured to visually represent the vehicle and the identified dangerous object on the precise map.

* * * * *